US011023086B2

United States Patent
Jung et al.

(10) Patent No.: US 11,023,086 B2
(45) Date of Patent: Jun. 1, 2021

(54) FOLDABLE MOBILE TERMINAL EXTRACTING A TOUCH INPUT COORDINATE FROM HORIZONTAL ELECTRODES OVERLAPPED BY THE TOUCH INPUT

(71) Applicant: LG ELECTRONICS INC., Seoul (KR)

(72) Inventors: Yunsuk Jung, Seoul (KR);
Seounghwan Seol, Seoul (KR);
Hangyu Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/452,855

(22) Filed: Jun. 26, 2019

(65) Prior Publication Data
US 2020/0097128 A1 Mar. 26, 2020

(30) Foreign Application Priority Data

Sep. 21, 2018 (KR) .......................... 10-2018-0114127

(51) Int. Cl.
*G06F 3/045* (2006.01)
*G06F 3/044* (2006.01)
(Continued)

(52) U.S. Cl.
CPC .......... *G06F 3/0448* (2019.05); *G06F 3/0412* (2013.01); *G06F 3/0446* (2019.05);
(Continued)

(58) Field of Classification Search
CPC .... G06F 3/0448; G06F 3/0446; G06F 3/0412; H04M 1/0216; H04M 1/0268
See application file for complete search history.

(56) References Cited

U.S. PATENT DOCUMENTS 8,947,392 B2 * 2/2015 Long ........................ G06F 3/044
178/18.06
2011/0141040 A1 * 6/2011 Kang .................... G06F 3/0412
345/173
(Continued)

FOREIGN PATENT DOCUMENTS

JP       2015-46165 A       3/2015
KR    10-2017-0049777 A    5/2017
KR    10-2018-0090243 A    8/2018

*Primary Examiner* — Adam J Snyder
(74) *Attorney, Agent, or Firm* — Birch, Stewart, Kolasch & Birch, LLP

(57) ABSTRACT

A mobile terminal including a first body; a second body arranged side by side with the first body in a first direction; a hinge unit connecting the first body and the second body and configured to vary an angle defined by the first body and the second body; a flexible display unit including a first area provided in one surface of the first body, a second area provided in one surface of the second body, and a third area provided in an area corresponding to the hinge unit; and a touch sensor in the flexible display unit. In addition, the touch sensor includes a plurality of first transparent electrodes extended in a second direction perpendicular to the first direction and arranged side by side in the first direction; a plurality of second transparent electrodes provided in the first area, and extended in the first direction and arranged side by side in the second direction; a plurality of third transparent electrodes provided in the second area, and extended in the first direction and arranged side by side in the second direction; and a drive IC configured to determine a touch point based on a touch signal sensed in the first transparent electrodes, the second transparent electrodes and the third transparent electrodes.

11 Claims, 10 Drawing Sheets

(a)

(b)

(51) Int. Cl.
 *H04M 1/02* (2006.01)
 *G06F 3/041* (2006.01)
(52) U.S. Cl.
 CPC . *H04M 1/0216* (2013.01); *G06F 2203/04102* (2013.01); *H04M 1/0268* (2013.01); *H04M 2250/22* (2013.01)

(56) References Cited

U.S. PATENT DOCUMENTS

| | | | | |
|---|---|---|---|---|
| 2011/0148435 | A1* | 6/2011 | Schwartz | G06F 3/0416 324/658 |
| 2014/0132553 | A1* | 5/2014 | Park | G06F 3/044 345/174 |
| 2015/0062028 | A1* | 3/2015 | Go | G06F 1/1616 345/173 |
| 2015/0241924 | A1* | 8/2015 | Chang | G06F 3/044 349/12 |
| 2015/0242022 | A1* | 8/2015 | Hung | G06F 3/044 345/174 |
| 2016/0188098 | A1* | 6/2016 | Her | G06F 1/1652 345/173 |
| 2016/0306462 | A1* | 10/2016 | Park | G06F 3/044 |
| 2017/0102813 | A1* | 4/2017 | Kuo | G06F 3/0416 |
| 2018/0081219 | A1* | 3/2018 | Kim | G06F 1/1643 |
| 2018/0101021 | A1 | 4/2018 | Namkung | |
| 2020/0081562 | A1* | 3/2020 | Shi | G06F 3/041 |

* cited by examiner (a)　　　　　　　　　　　　　　(b)

(a)

(b)

(a)

(b)

(a)

(b)

(a)

(b)

FOLDABLE MOBILE TERMINAL EXTRACTING A TOUCH INPUT COORDINATE FROM HORIZONTAL ELECTRODES OVERLAPPED BY THE TOUCH INPUT

CROSS-REFERENCE TO RELATED APPLICATIONS

Pursuant to 35 U.S.C. § 119(a), this application claims the benefit of an earlier filing date and priority to Korean Application No. 10-2018-0114127 filed in the Republic of Korea on Sep. 21, 2018, the contents of which are incorporated by reference herein in its entirety.

BACKGROUND OF THE INVENTION

Field of the Invention

Embodiments of the present disclosure relate to a foldable mobile terminal having an improved reliability of a flexible display.

Discussion of the Related Art

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Recently, there are ongoing developments of foldable mobile terminals that use OLED displays having organic light emitting diodes. A window disposed on a front surface of an OLED display becomes thinner and a structure for supporting a rear surface of the OLED display also becomes thinner in such a foldable mobile terminal than in a conventional mobile terminal. Accordingly, such the foldable mobile terminal has a disadvantage of a weak OLED.

SUMMARY OF THE INVENTION

Accordingly, an object of the present invention is to address the above-noted and other problems and provide a foldable mobile terminal having an improved reliability of a flexible display.

Embodiments of the present disclosure may provide a mobile terminal comprising a first body; a second body arranged adjacent to the first body side by side in a first direction; a hinge unit configured to connect the first body and the second body with each other to vary an angle defined by the first body and the second body; a flexible display unit comprising a first area provided in one surface of the first body; a second area provided in one surface of the second body; and a third area provided in a corresponding area to the hinge unit; and a touch sensor formed in the flexible display unit, wherein the touch sensor comprises a plurality of first transparent electrodes extended in a second direction that is perpendicular to the first direction and arranged side by side in the first direction; a plurality of second transparent electrodes provided in the first area, and extended in the first direction and arranged side by side in the second direction; a plurality of third transparent electrodes provided in the second area, and extended in the first direction and arranged side by side in second direction; and a drive IC configured to judge a touch point based on a touch signal sensed in the first transparent electrodes, the second transparent electrodes and the third transparent electrodes.

The width of the third area may be 10 mm or less.

The drive IC may be arranged in a predetermined area of the first or second body, adjacent to the hinge unit.

The drive IC may extract a coordinate of a touch input in the second direction based on a signal sensed in the second transparent electrode or the third transparent electrode, when a signal is sensed in a first transparent electrode of the third area.

The mobile terminal may further comprise a plurality of first signal lines configured to connect the drive IC with the first transparent electrodes, respectively; a plurality of second signal lines configured to connect the drive IC with the second transparent electrodes, respectively; and a plurality of third signal lines configured to connect the drive IC with the third transparent electrodes, respectively, wherein the first signal lines, the second signal lines and the third signal lines are located in outer edge areas of the first transparent electrodes, the second transparent electrodes and the third transparent electrodes, respectively.

The touch sensor may further comprise a plurality of fourth transparent electrodes provided in an area corresponding to the third area, and extended in the first direction and arranged side by side in the second direction.

The fourth transparent electrodes may comprise a plurality of first conductive patterns arranged side by side in the first direction; and a plurality of second conductive patterns arranged to connect the first conductive patterns with each other.

The fourth transparent electrodes may be connected with at least one of the second and third transparent electrodes.

Both ends of the fourth transparent electrode may be connected with the second transparent electrode and the third transparent electrode, respectively, and the touch sensor may comprise a plurality of first signal lines provided to connect the drive IC with the first transparent electrodes, respectively; a plurality of second signal lines provided to connect the drive IC with the second or third transparent electrodes connected with the fourth transparent electrodes, respectively.

The touch sensor may further comprise an insulating film having one surface in which the second transparent electrodes, the third transparent electrodes and the first conductive patterns are formed and the other surface in which the second conductive patters are formed; and a via-hole penetrating the insulating film to connect the first conductive patterns with the second conductive patterns.

The second conductive pattern may comprise a first portion extended from one end of the first conductive pattern in the second direction; and a second portion connected with the first portion and extended in the first direction.

According to embodiments of the present disclosure, the mobile terminal in accordance may have the enhanced structure of the touch sensor arranged in the flexible display unit. Accordingly, the flexible display unit may be bending even with a smaller curvature radius and the thickness of the mobile terminal in the folded state may be reduced.

Furthermore, the horizontal transparent electrode arranged in the folded area of the flexible display unit is not cut away. Accordingly, the touch sensor may be prevented from damage in use.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
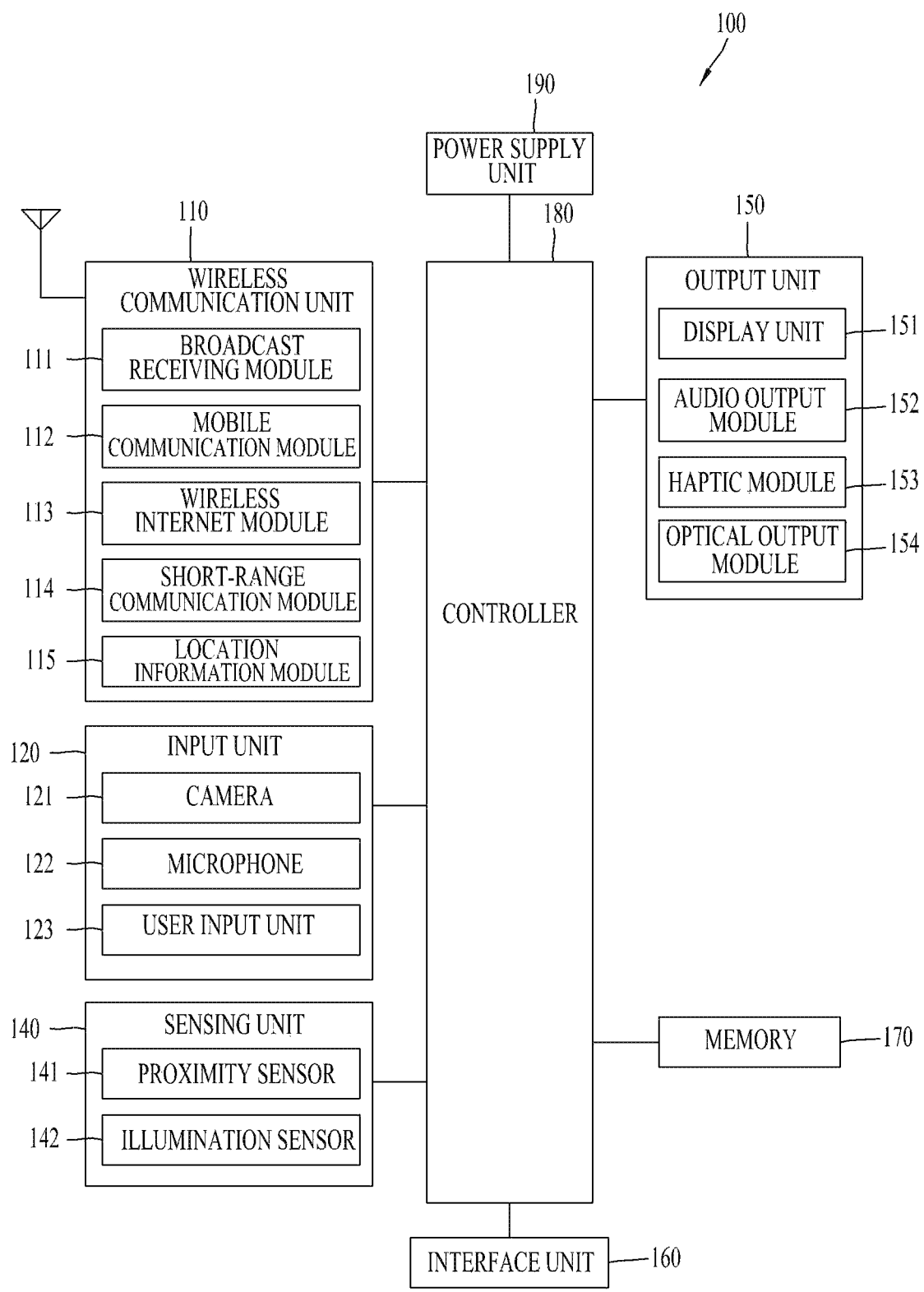
FIG. 1 is a block diagram of a mobile terminal in accordance with the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components in FIG. 1 is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1. Moreover, the controller 180 can be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
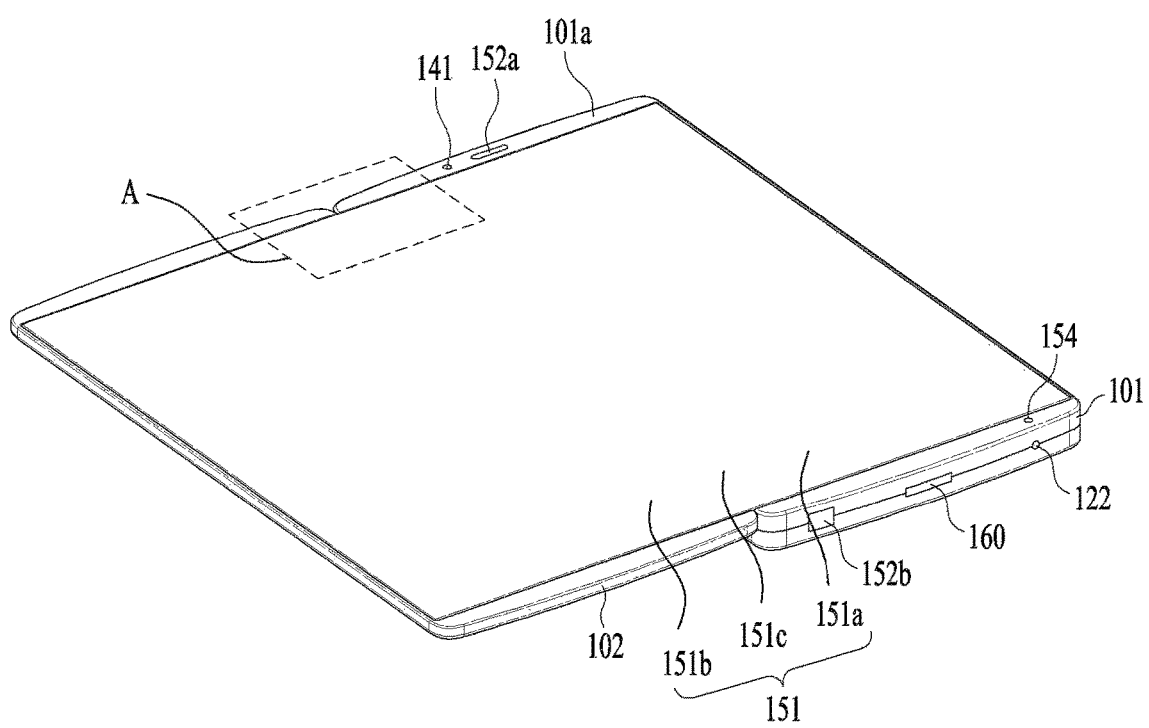
FIGS. 2A and 2B are diagrams illustrating a first state and a second state of the mobile terminal in accordance with one embodiment.
Figure 2B:
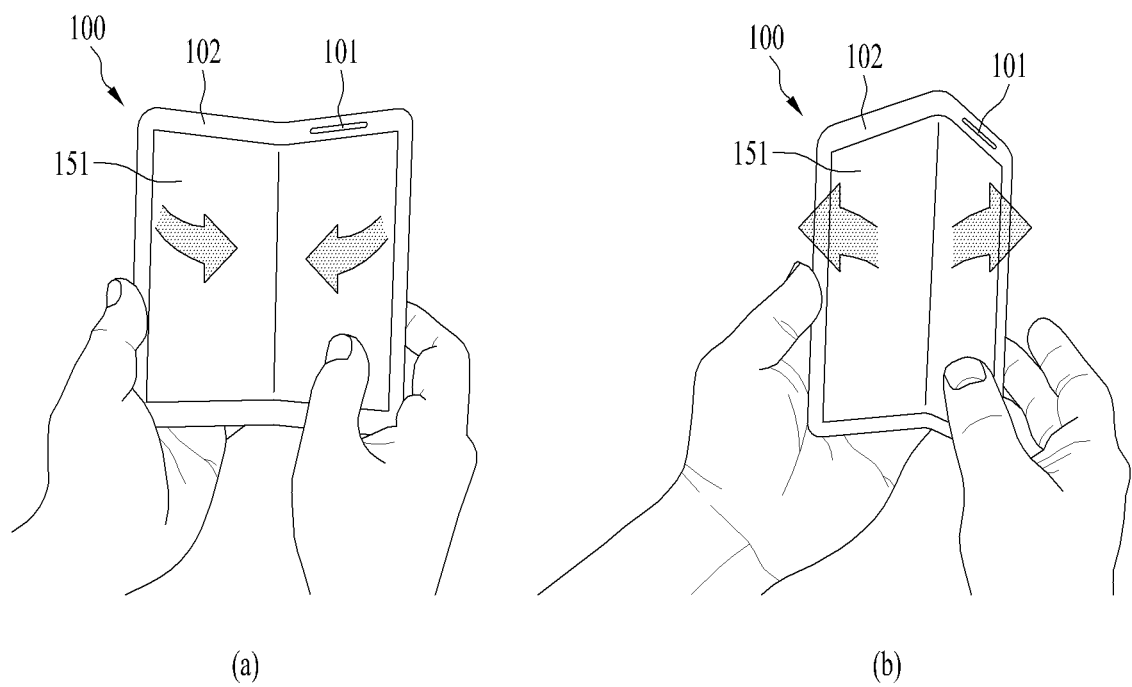

FIGS. 2A and 2B are diagrams illustrating a first state and a second state of the mobile terminal 100 in accordance with one embodiment. The mobile terminal is configured of two bodies. A second body 102 is arranged in a lateral surface of a first body 101 in a first direction. The first body 101 and the second body 102 are coupled to each other by a hinge unit such that an angle between the first body 101 and the second body 102 may be variable.

On the drawing, the first body 101 and the second body 102 are formed in a rectangular shape. The second body 102 is arranged next to a long side of the first body 101 in side by side. The direction along the widths of the first and second bodies 101 and 102 may be referred to as 'a first direction' and a longitudinal direction of the first and second bodies 101 and 102 that is perpendicular to the first direction may be referred to as 'a second direction.' In this instance, the first direction and the second direction are not limited to the width direction and the longitudinal direction, respectively. The first direction may be the longitudinal direction and the second direction may be the width direction.

The first body 101 and the second body 102 may be formed in the same size. In this embodiment, most electronic components are loaded in the first body 101 and the other thinner components may be loaded in the first body 101. When the space having the electronic components are loaded is divided into two spaces, a useable space decreases in comparison to the actual volume. Accordingly, it is advantageous in reducing the overall size to load most of the electronic elements in the one-sided body.

The mobile terminal 100 includes a case that defines an exterior design (e.g., a frame, a housing, a cover or the like). A plurality of cases may be coupled to each other to define an internal space and diverse electronic components are disposed in the internal space.

A display unit 151 may be disposed on a front surface of the terminal body to output information. In addition, a window of the display unit 151 may be mounted in a front case and define a front surface of the terminal body, together with the front case. Such the cases may be formed by injecting a synthetic resin or made of metal (e.g., stainless, steel (STS), aluminum (Al), titanium (Ti) or the like).

The mobile terminal 100 may include one case that defines the internal space. In this instance, a uni-body mobile terminal 100 having synthetic resin or metal that is continuously provided from a lateral surface to a rear surface may be realized.

The mobile terminal 100 may include the display unit 151, an audio output unit 152, a proximity sensor 141, an illuminance sensor 142, an optical output unit 154, a camera 121, a user input unit 123, a microphone 122, an interface unit 160 and the like.

The display unit 151 may be configured to display (or output) the information configured to be processed in the mobile terminal 100. As one example, the display unit 151 may display information on an execution image of an application program implemented in the mobile terminal 100 or User Interface (UI) and Graphic User Interface (GUI) information according to the information on such an execution screen. The display unit 151 may include at least one of a liquid crystal display (LCD), a thin film transistor-liquid crystal display (TFT LCD, an organic light-emitting diode (OLED), a 3D display and an e-ink display.

Especially, the mobile terminal in accordance with the present invention may use a display unit 151 having a variable curvature when the two bodies are rotated on the hinge unit. As shown in FIG. 2B, the display unit 151 is deformable by an external force. Examples of such deformation may include at least one of being curved, bendable, foldable, twisted and rolled.

The mobile terminal may be bendable in only one direction or in both directions as shown in FIG. 2B according to a coupling method of a flexible display unit 151 with respect to the bodies or a type of a hinge.

Such deformable display unit 151 may be referred to as the flexible display unit'. In this instance, the flexible display unit 151 may include a conventional flexible display, an e-paper and combination of the two.

The conventional flexible display unit 151 means a display that is strong and unbreakable easily, because it is fabricated on a substrate as thin and flexible as possible to be curved, bendable, foldable, twisted or rolled like paper while keeping characteristics of a conventional thin flat display. Especially, the OLED display using OLED may be realized as a flexible display without backlights. Even if being bent, the OLED display has little effect on images and used for the flexible display.

Moreover, the e-paper is the display technique having characteristics of conventional ink and it may be different from the conventional thin flat display in using a reflected light. The e-paper may change information, using a twist-ball or electrophoresis using a capsule.

In a state where the flexible display 151 is unvaried (e.g., a state having an infinite curvature radius, hereinafter, a first state), a display area of the flexible display unit 151 becomes flat. In a state where the first state is deformed by an external force (e.g., a state having a finite curvature radius, hereinafter, a second state), the display area of the flexible display becomes curved. As shown in the drawing, the information displayed in the second state may be visual information that is output on the curved surface. Such visual information may be realized by independently controlling light-emitting of a unit of pixels arranged in the matrix. The unit of the pixels means the unit of minimum pixels for realizing one color.

The flexible display unit 151 may be disposed in a bending state (e.g., a vertically or horizontally bending state), not the first flat state. When an external force is applied to the flexible display unit 151 in this instance, the flexible display unit 151 may be deformed into a more bending state than the flat state (or less bending state).

The flexible display unit 151 may include a touch sensor configured to sense a touch on the flexible display unit 151 so as to receive an input of a control command according to a touch method. When a touch on the flexible display unit 151 is input, the touch sensor may senses the touch and the controller 180 can generate a corresponding control command based on the sensed touch. The contents input by the touch method may include texture or numbers and menu items indicated or designated in various modes.

In addition, the touch sensor may be configured as a film having a touch pattern disposed between the window and a display disposed on the rear surface of the window or a metal wire directly patterned on the rear surface of the window. Alternatively, the touch sensor may be integrally formed with a display panel. As one example, the touch sensor may be disposed on a substrate of the display panel or in the display panel.

As mentioned above, the flexible display 151 may form a touch screen, together with the touch sensor. In this instance, the touch screen may function as the user input unit (123, see FIG. 1). The flexible touch screen may be configured to sense a touch input not only in the first state but also the second state.

In addition, the mobile terminal 100 may include deformation sensing mechanism configured to sense deformation of the flexible display unit 151. Such deformation sensing means may be provided in the sensing unit (140, see FIG. 1).

The deformation sensing mechanism may be provided in the flexible display unit 151 or the case 101 and configured to sense the information regarding the deformation of the flexible display unit 151 may include a direction in which the flexible display unit 151 is deformed, a degree of deformation, a position of deformation, a point of time of deformation and an acceleration at which the flexible display unit 151 is restored from the deformed state. In addition, the information related with the deformation may include various tips of sensible information when the flexible display unit 151 is bending.

The controller 180 can change the information displayed on the flexible display unit 151 or generate a control signal for controlling the functions of the mobile terminal 100 based on the information regarding the deformation of the flexible display unit 151 sensed by the deformation sensing means.

In addition, the mobile terminal 100 may include a case 101 provided to accommodate the flexible display unit 151. The case 101 may be deformable together with the flexible display unit 151 by an external force, considering the characteristics of the flexible display unit 151.

The state-deformation of the flexible display unit 151 is not limited only by the external force. For example, when the flexible display unit 151 is in the first state, the current first state may be changed into the second state by a user or a command of an application program.

The flexible display unit 151 may have a first area 151*a* located in one surface of the first body 101; a second area 151*b* located in one surface of the second body 102; and a third area 151*c* located between the first area 151*a* and the second area 151b, in the second state. The third area 151c may cover lateral surfaces of the first and second bodies 101 and 102 in the second state.

When the first and second bodies 101 and 102 are made of a soft material, the first and second areas 151a and 151b that are attached to the first body 101 may not be bending. However, when the second state is changed into the first state, the third area 151c of the flexible display unit 151 may be bending.

The first audio output unit 152a may be realized as a receiver configured to deliver a voice or ring of a call and a second audio output unit 152b may be realized as a loud speaker configured to output sounds of diverse alarms or a played sound of a multi-media.

The optical output unit 154 may be configured to output light for noticing presence of an event. Examples of the event include receiving a message or a call signal, a missed call, an alarm, notification of a schedule, receiving an e-mail, information reception via an application program and the like. The controller 180 can control the optical output unit 154 to end the light emitting once sensing the user checked the presence of the event.

The camera 121 may be configured to process a picture frame of a still or moving image that is gained by an image sensor in a camera mode or a video call mode. The processed picture image may be displayed on the display unit 151 and stored in the memory 170.

The user input unit 123 may be one example of the user input unit manipulated by the user to receive an input of a command for controlling the operations of the mobile terminal 100 and it may be called the manipulating portion. Any types of user input units may be applicable as the user input unit 123 only when using a tactile manner configured to allow the user to manipulate the user input unit while feeling a tactile sense. The contents input via the user input unit 123 may be set variously.

In addition, the mobile terminal 100 may include a finger scan sensor configured to recognize the user's finger-print. The controller 180 can use the information regarding the finger-print scanned by the finger scan sensor as user authentication. The finger scan sensor may be embedded in the display unit 151 or the user input unit 123.

The microphone 122 may be configured to receive of an input of the user's voice or other sounds. A plurality of microphones 122 may be provided in a plurality of positions to receive inputs of stereo sounds.

The interface unit 160 may serve as a passage for connecting the mobile terminal 100 to external devices. For example, the interface unit 160 may include at least one of a connection terminal with other devices (e.g., an earphone, and an external speaker), a port for short range communication (e.g., an infrared port (IrDA Port), a Bluetooth port, a wireless LAN port and the like or at least one of power supply terminals for supplying an electric power to the mobile terminal 100. Such the interface unit 160 may be realized as a socket type configured to load an external card such as Subscriber Identification Module (SIM), User Identity Module (UIM) or a memory card for storing information.

The second audio output unit 152b may be additionally loaded in the terminal body. The second audio output unit 152b may realize a stereo function, together with the first audio output unit 152a, and it may be used in realizing a speaker phone mode.

One or more antennas may be provided in the terminal body. The antennas may be embedded in the terminal body or formed in the case. As one example, an antenna that partially forms the broadcasting reception module (111, see FIG. 1) may be retractable from the terminal body. Alternatively, an antenna may be formed as a film type attached to an inner surface of a rear cover 103 or a case having a conductive material may function as the antenna.

The power supply unit (190, see FIG. 1) configured to supply the power to the mobile terminal 100 may be provided in the terminal body. The power supply unit 190 may include a battery that is embedded in the terminal body or detachable from the terminal body.

The battery may be supplied the electric power via a power cable connected to the interface unit 160. Also, the battery may be wirelessly chargeable in a wireless charger. The wireless charging may be realized by a magnetic induction or resonance (magnetic resonance) manner.

The mobile terminal 100 may further include accessories configured to protect the external design or assist or expand the functions. One example of the accessories may be a cover or pouch that covers or accommodates one or more surfaces of the mobile terminal 100. The cover or pouch may be linked with the display unit 151 to expand the functions of the mobile terminal 100. Another example of the accessories may be a touch pen provided to assist or expand the touch input on the touch screen.

Figure 3:
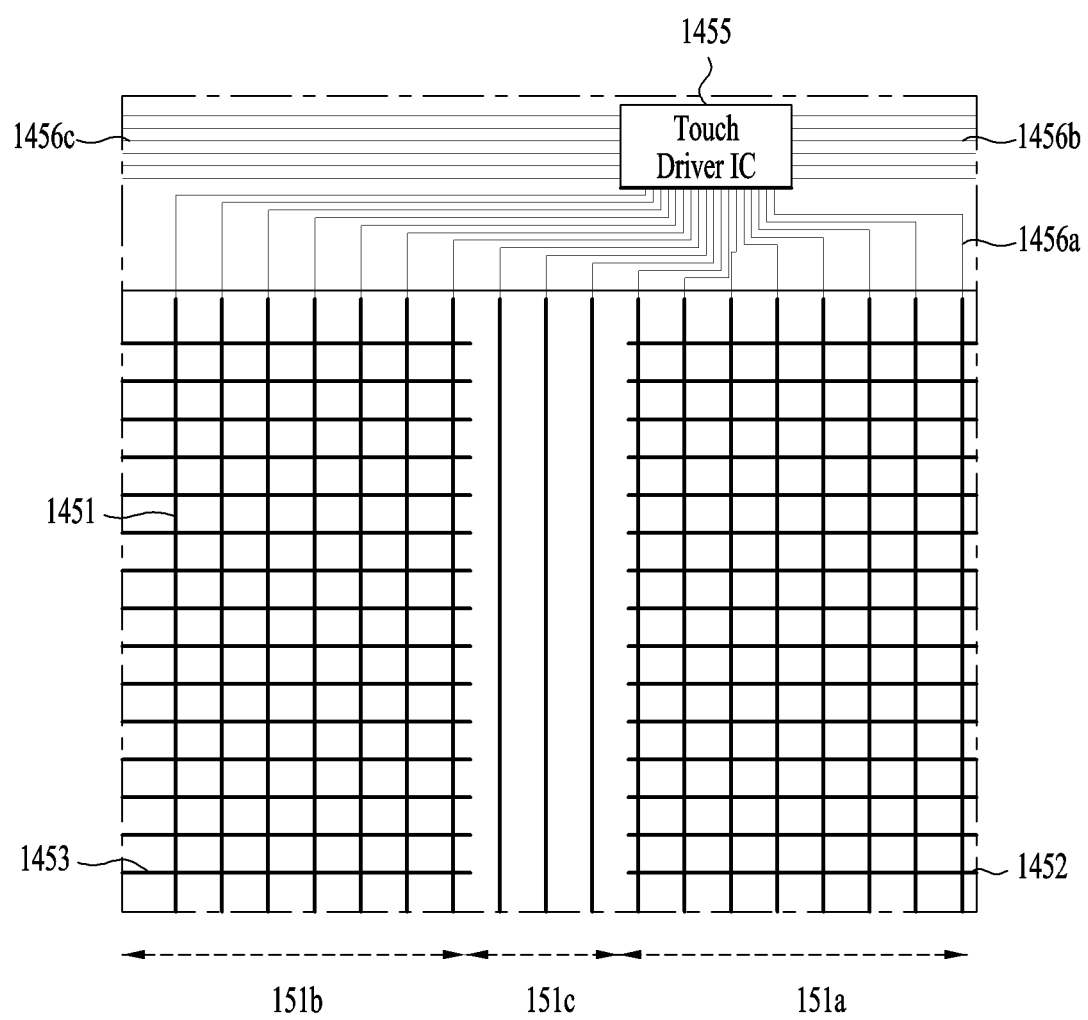
FIG. 3 is a diagram illustrating a touch sensor in accordance with one embodiment.

Next, FIG. 3 is a diagram of one embodiment of the touch sensor and illustrating 'A' of FIG. 2A. The touch sensor may be located between the flexible display unit 151 and the window covering the front surface of the flexible display unit 151 or configured as some part of a multi-layer structure of the flexible display unit 151.

The touch sensor may be formed as a resistive type, a capacitive type or a light amount type. The capacitive touch sensor is the commonly used type touch sensor that is actuated by recognizing change of the capacitance of a conductor when a conductor is touched by the user.

Accordingly, the touch sensor requires an electrode to sense the touch input. When the touch sensor is provided on the front surface of the display unit on which an image is output, the electrode may be formed of a transparent conductive material not to hide the image. Hereinafter, the electrode used in the touch sensor may be referred to as the transparent electrode and the transparent electrode may be usually formed of Indium Tin Oxide (ITO).

The transparent electrode includes a vertical transparent electrode extended in a y-axis direction and a horizontal transparent electrode extended in an x-axis direction to figure out a touch point precisely. A plurality of vertical transparent electrodes may be aligned in the x-axis direction in parallel and a plurality of horizontal transparent electrodes may be aligned in the y-axis direction in parallel.

A signal line is provided to connect each of the electrodes to a drive IC configured to apply an electric power to each of the transparent electrodes and sense capacitance variation of each electrode. When the capacitance of at least one of the first transparent electrodes 1451 and horizontal transparent electrodes changes, a touch point can be judged based on the information of the x-axis coordinate at which the vertical transparent electrode having the varied capacitance is located and the information of the y-axis coordinate at which the horizontal transparent electrode having the varied capacitance is located.

As shown, the vertical transparent electrodes and the horizontal transparent electrodes are crossed in a grid pattern. To prevent direct contact, an insulation material may be disposed between grid intersections of the vertical transparent electrodes and the second transparent electrodes.

Figure 4:
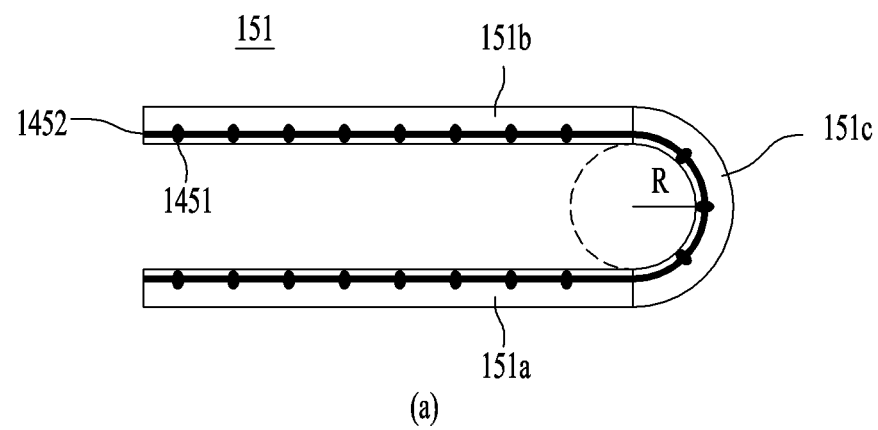
FIG. 4 is a diagram illustrating one example of a conventional flexible display that becomes folded.
Figure 4:
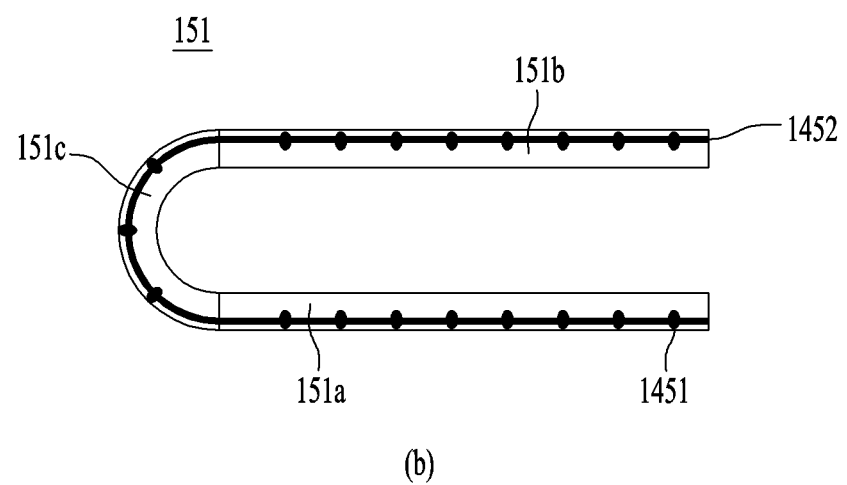

When using the mobile terminal using the flexible display unit that is foldable as shown in FIG. 2B, the electrode(s) formed in the third area 151c where the horizontal transparent electrodes are folded could be damaged. FIG. 4 is a diagram illustrating one example that the conventional flexible display unit 151 is bent. If the curvature radius of the third area 151c becomes small, the horizontal transparent electrodes might be cut or torn. Thus, the third area 151c has to be curved with a larger curvature radius.

When both sides of the display unit are folded to face each other as shown in FIG. 2B (a), the first and second bodies might be disadvantageously folded in a state of being spaced a distance as far as twice the curvature radius of the third area 151c from each other as shown in FIG. 4 (a).

When both sides of the display unit are folded to face outside as shown in FIG. 2B (b), the first and second bodies become located between the first area 151a and the second area 151b such that the overall thickness can be thinner than the display unit shown in FIG. 4 (a) but it may be still thick enough to deteriorate portability.

Figure 5:
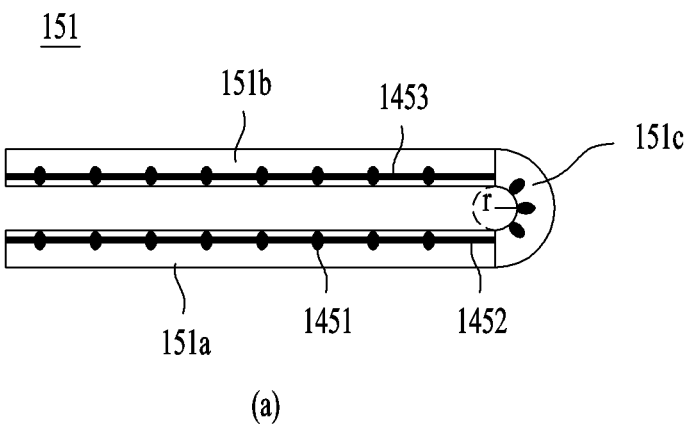
FIG. 5 is one example of a flexible display of the mobile terminal in accordance with the present invention which becomes folded.
Figure 5:
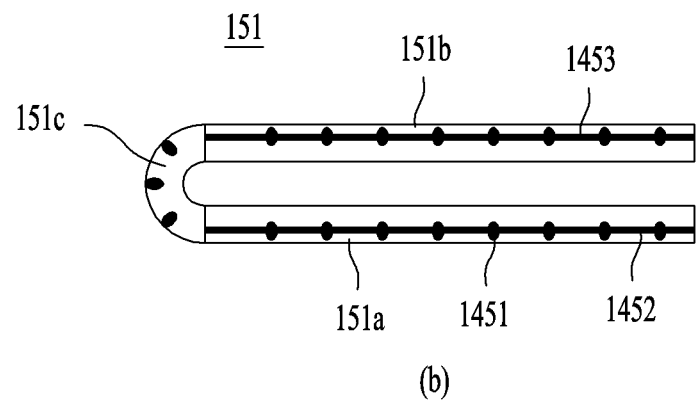

Next, FIG. 5 is one example of a flexible display of the mobile terminal in accordance with the present invention which becomes folded. In this example, the horizontal transparent electrodes extended in the x-axis direction and located in the third area 151c are omitted and the third area 151c may be bent with a still smaller curvature radius. All of the horizontal transparent electrodes need not be omitted from the third area 151c and ends of the second and third transparent electrodes 1452 and 1453 may be located even some of the third area adjacent to the first area 151a and the second area 151b as shown in FIG. 3.

Even when both sides of the display unit are facing each other as shown in FIG. 5 (a), there are no transparent electrodes extended in the same direction (or the x-axis direction) with the direction in which the display unit is bent in the third area 151c and the flexible display unit 151 can then be bent with a smaller curvature radius (r) than the flexible display unit shown in FIG. 4 (a).

When both sides of the display unit are folded to face outside as shown in FIG. 5 (b), the first and second bodies are located between the first area 151a and the second area 151b and folded in close contact. The mobile terminal in the folded state is thin and the third area 151c of the display unit is prevented from damage.

Instead of the conventional horizontal transparent electrodes extended in the horizontal direction, the transparent electrodes may be divided into second transparent electrodes 1452 arranged in the first body and third transparent electrodes 1453 arranged in the second body (hereinafter, the vertical transparent electrodes extended in the y-axis are referred to as 'the first transparent electrodes 1451).

The signal sensed in each of the transparent electrodes can be collected in the drive IC 1455 and the drive IC can sense a touch point. One signal line 1456a, 1456b and 1456c configured to connect one of the transparent electrodes with the drive IC 1455 may be arranged in a bezel area as a deactivated area on which no image is output, in other words, an outer area of the transparent electrode 1451, 1452 and 1453. A first signal line 1456a connected with the drive IC 1455 is located only in one end of the first transparent electrode 1451. However, the horizontal electrodes of this embodiment are divided into the second transparent electrode 1452 and the third transparent electrode 1453 from side to side. In this instance, a second signal line 1456b connected with the second transparent electrode 1452 does not connect the third transparent electrode 1453 to the drive IC 1455. Accordingly, the second signal line 1456b connected with the second transparent electrode 1452 is arranged in a right bezel and the third signal 1456c connected with the third transparent electrode 1453 is arranged in a left bezel.

As the second signal line 1456b and the third signal line 1456c are arranged in the right and left sides dividedly, signals for judging a y-coordinate of a touch input sensed in the first or second area 151a or 151b are transmitted to the drive IC along a different route. If inputs are sensed in the first area 151a and the second area 151b sequentially, the former and latter inputs might be changed disadvantageously. Accordingly, for the balance of the both inputs, the drive IC can be arranged adjacent to the third area 151c.

However, there is a concern that the drive IC might damage if it is located in the hinge unit. The drive IC may be located in the first or second body 101 or 102, adjacent to the hinge unit.

As shown in FIG. 5, when the curvature radius becomes small, the width of the third area 151c may become small. Considering the thickness of the terminal body, the width of the third area 151c may be approximately 10 mm or less.

Figure 6:
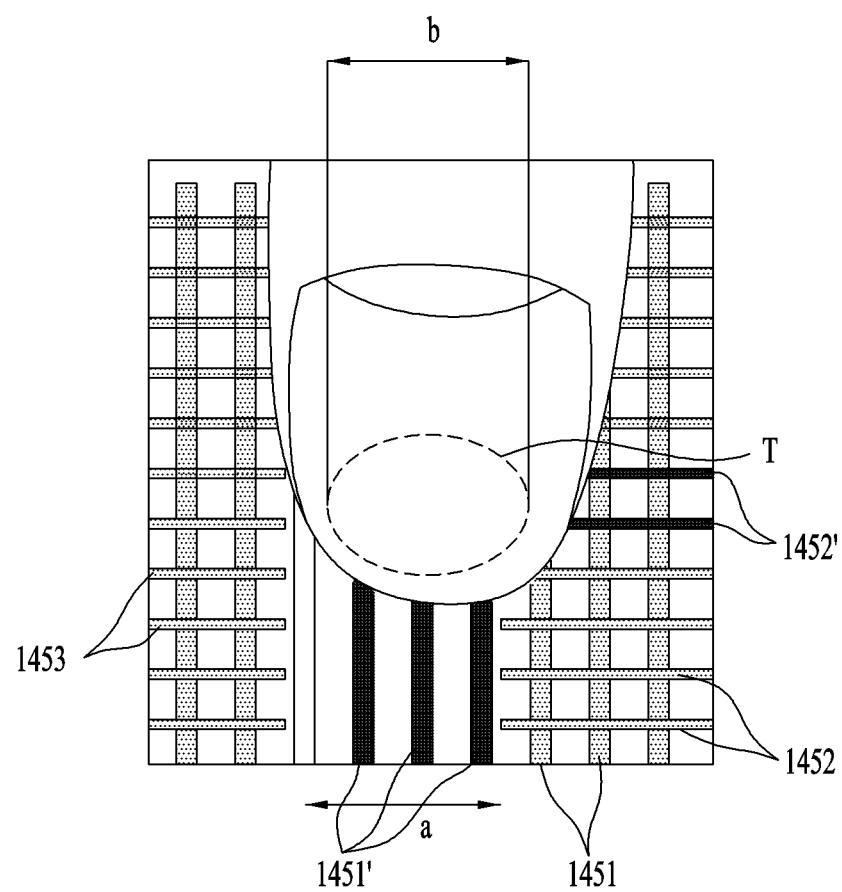
FIG. 6 is a diagram to describe one example of touch input to the touch sensor shown in FIG. 3.

Next, FIG. 6 is a diagram to describe one example of a touch input to the touch sensor shown in FIG. 3. When the user touches the front surface of the flexible display unit 151 with his finger, the capacitance of the first, second or third transparent electrode 1451, 1452 or 1453 overlapped with a touched point (T) is varied and the touch input is sensed. The horizontal transparent electrodes are located in the first area 151a and the second area 151b so as to sense a y-axis coordinate of the touch input. However, there is a problem that no horizontal transparent electrode is arranged in the third area 151c.

However, as shown in FIG. 6, when the user touches a point corresponding to the third area 151c with their finger, the width (b) of the touched point (T) is broader than the width (a) of the third area 151c such that the touched point (T) may be overlapped with the first or second area 151a or 151b. In the drawing, the touched point (T) is overlapped with the second transparent electrodes 1452 located in the first area 151a and a y-axis coordinate of the touch input can be gained from a second transparent electrode 1452' having a varied capacitance out of the second transparent electrodes 1452.

Figure 7:
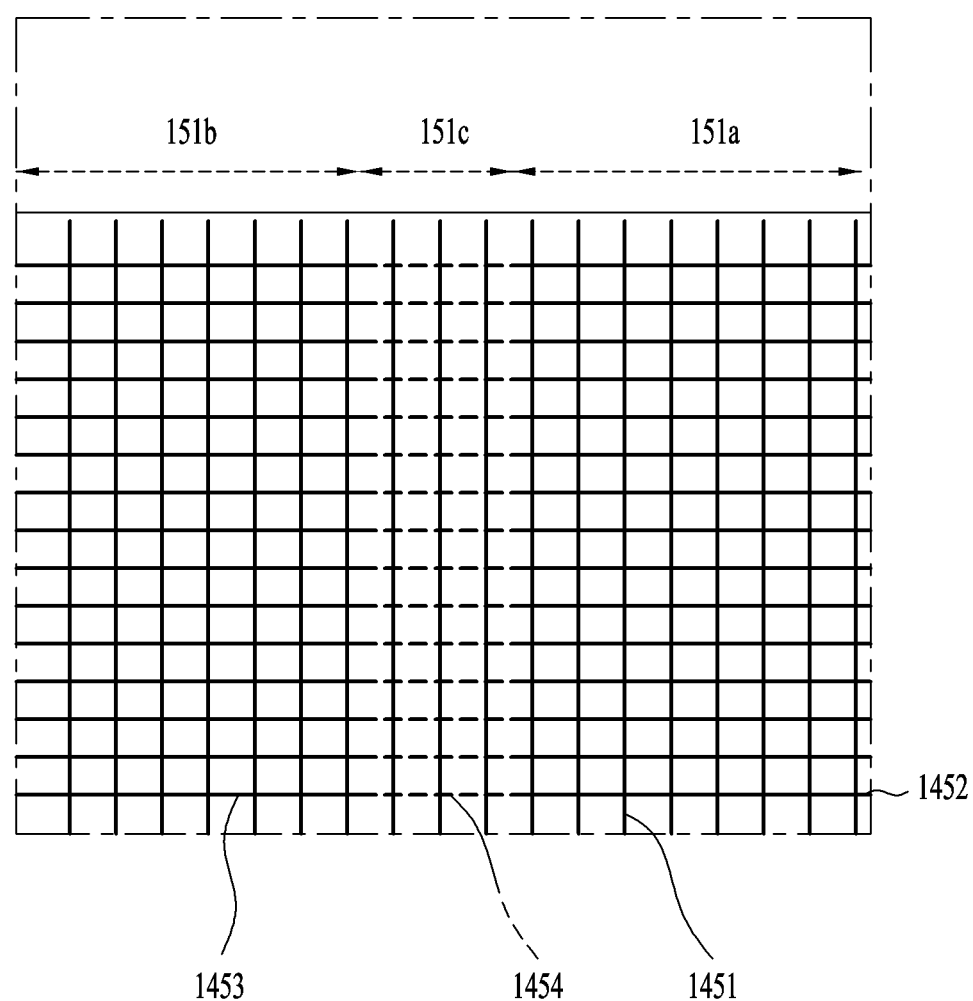
FIG. 7 is a diagram illustrating a touch sensor in accordance with another embodiment.

FIG. 7 is a diagram illustrating a touch sensor in accordance with another embodiment. In this embodiment, the touch sensor may further include a fourth transparent electrode 1454 that is located in the third area 151c. Different from the first through third transparent electrodes, the fourth transparent electrode 1454 may have combination of a first conductive pattern 1454a and a second conductive pattern 1454b.

Figure 8:
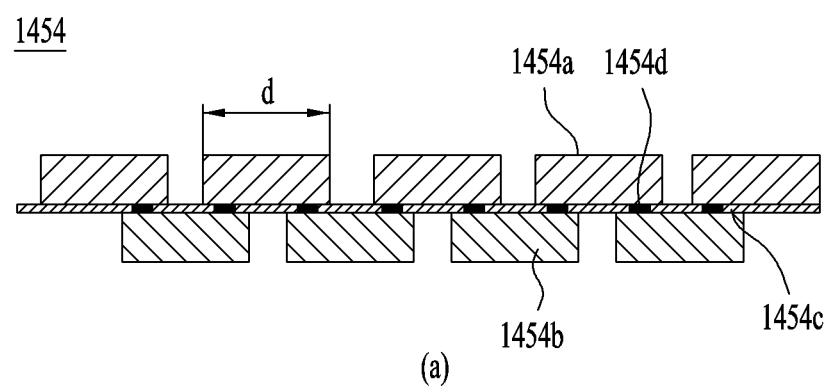
FIG. 8 is a sectional diagram illustrating one embodiment of a fourth transparent electrode provided in the touch sensor.
Figure 8:
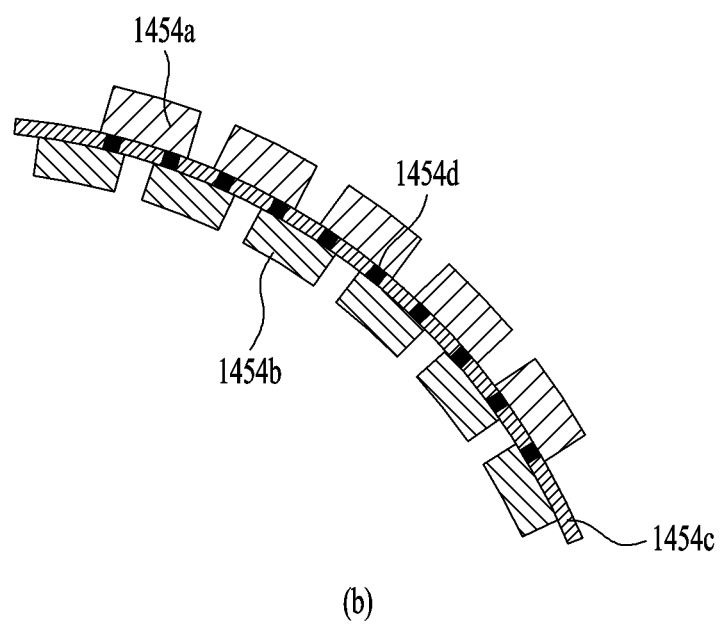

FIG. 8 is a sectional diagram illustrating one embodiment of the fourth transparent electrode 1454 provided in the touch sensor. As shown in FIG. 8 (a), one fourth transparent electrode 1454 includes a plurality of first conductive patterns 1454a. The plurality of the first conductive patterns 1454a may be spaced a preset distance apart from each other. A plurality of second conductive patterns 1454b may be provided to connect the plurality of the first conductive patterns 1454a with each other.

The second transparent electrode 1452 and the third transparent electrode 1453 may be formed on an insulating film 1454c. The first conductive patterns 1454a are formed on one surface of the insulating film 1454c and the second conductive patterns 1454b are formed on the other surface of the insulating film 1454c. After that, via-holes 1454d are formed in the insulating film 1454c to electrically connect the first conductive patterns 1454a and the second conductive patterns 1454b with each other. In other words, the plurality of the first conductive patterns 1454a and the plurality of the second conductive patterns 1454b are connected with each other such that one fourth transparent electrode 1454 can be formed.

Such the segmented fourth transparent electrode 1454 may be flexible easily even if bending as shown in FIG. 8 (b), because there are spaced distances between the first and second conductive patterns 1454a and 1454b. Accordingly, the curvature radius of the third area 151c can be reduced and the width of the third area 151c can be reduced as well.

Figure 9:
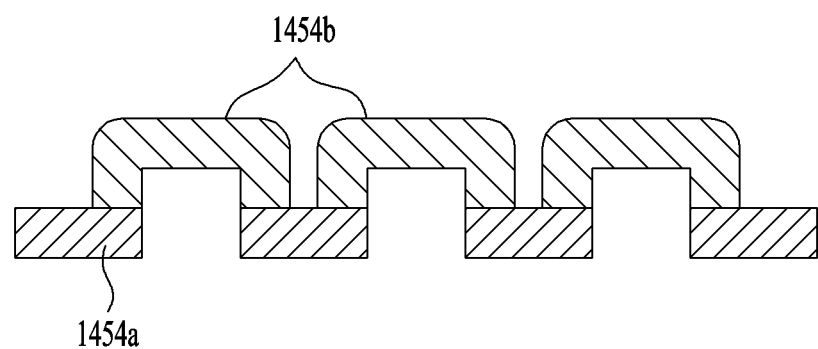
FIG. 9 is a sectional diagram illustrating another embodiment of the fourth transparent electrode of the touch sensor.
Figure 9:
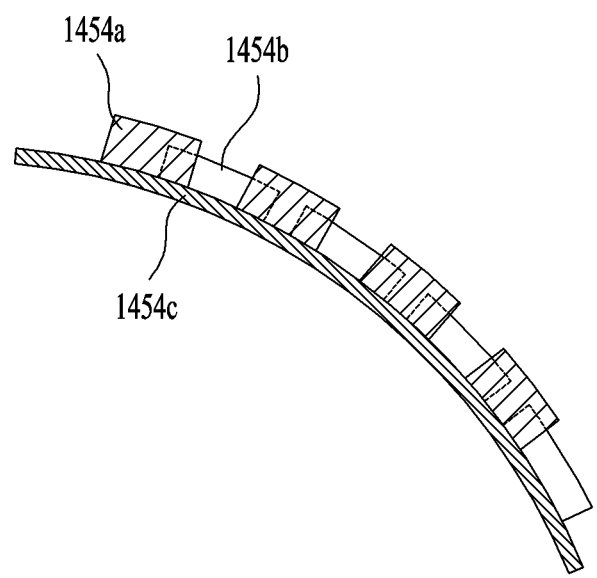

In addition to the method of forming the first conductive patterns 1454a and the second conductive patterns 1454b in the direction along the thickness, the first conductive patterns 1454a and the second conductive patterns 1454b can be arranged in a direction on the plane. FIG. 9 is a sectional diagram illustrating another embodiment of the fourth transparent electrode 1454 of the touch sensor. FIG. 9 (a) is a plane view and FIG. 9 (b) is a side view.

As shown in FIG. 9 (a), the first conductive patterns 1454a are arranged in one surface of the insulating film 1454c in a first direction side by side and connected with each other by using the second conductive patterns 1454b formed in a "c" shape. The second conductive pattern 1454b may include a first portion extended in a second direction and a second portion extended in the first direction. The first portion may have no influence on the flexible display unit 151 when the flexible display unit 151 is bending as shown in FIG. 9 (b). Also, each of the first conductive patterns 1454a is spaced a preset distance apart from each other and each of the second conductive patterns 1454b is also spaced a preset distance apart from each other. Accordingly, the flexible display unit 151 can be smoothly bent as shown in FIG. 9 (b) and the curvature radius of the third area 151c in the second state can be reduced and width of the third area 151c can be also reduced.

When the fourth transparent electrode 1454 is provided between each two of the second and third transparent electrodes 1452 and 1453 to connect them, horizontal transparent electrodes can be continuously formed from the right bezel to the left bezel. Accordingly, the signal line may be connected with only one of the second or third transparent electrode 1452 or 1453 such that the number of the signal lines can be reduced.

As mentioned above, the mobile terminal in accordance with the embodiments of the present disclosure has an enhanced structure of the touch sensor arranged in the flexible display unit 151. Accordingly, the flexible display unit 151 can be bent even with a smaller curvature radius and the thickness of the mobile terminal in the folded state can be reduced.

Furthermore, the horizontal transparent electrode arranged in the folded area of the flexible display unit 151 is not cut away. Accordingly, the touch sensor can be prevented from damage in use.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a first body;
a second body arranged side by side with the first body in a first direction;
a hinge unit connecting the first body and the second body and configured to vary an angle defined by the first body and the second body;
a flexible display unit including a first area provided in one surface of the first body, a second area provided in one surface of the second body, and a third area provided in an area corresponding to the hinge unit; and
a touch sensor in the flexible display unit,
wherein the touch sensor comprises:
a plurality of first transparent electrodes provided in the first area, the second area and the third area and extended in a second direction perpendicular to the first direction and arranged side by side in the first direction;
a plurality of second transparent electrodes provided in the first area, and extended in the first direction and arranged side by side in the second direction;
a plurality of third transparent electrodes provided in the second area, and extended in the first direction and arranged side by side in the second direction;
a plurality of fourth transparent electrodes provided in an area corresponding to the third area, and arranged side by side in the second direction; and
a drive IC configured to determine a touch point based on a touch signal sensed in the first transparent electrodes, the second transparent electrodes and the third transparent electrodes, and
wherein each fourth transparent electrode comprises:
a plurality of first conductive patterns formed on a first surface of an insulating film, and arranged side by side in the first direction; and
a plurality of second conductive patterns formed on the first surface of the insulating film, and connecting the first conductive patterns with each other, and
wherein each second conductive pattern comprises:
a first portion extended in the first direction; and
two second portions extended from ends of the first portion of the second conductive pattern in the second direction and connected with the first conductive patterns.

2. The mobile terminal of claim 1, wherein a width of the third area is 10 mm or less.

3. The mobile terminal of claim 1, wherein the drive IC is arranged in a predetermined area of the first body or the second body, adjacent to the hinge unit.

4. The mobile terminal of claim 1, further comprising:
a plurality of first signal lines connecting the drive IC with the first transparent electrodes, respectively;
a plurality of second signal lines connecting the drive IC with the second transparent electrodes, respectively; and
a plurality of third signal lines connecting the drive IC with the third transparent electrodes, respectively,
wherein the first signal lines, the second signal lines, and the third signal lines are located in outer edge areas of the first transparent electrodes, the second transparent electrodes and the third transparent electrodes, respectively.

5. The mobile terminal of claim 1, wherein the fourth transparent electrodes are connected with at least one of the second transparent electrodes and the third transparent electrodes.

6. The mobile terminal of claim 1, wherein both ends of a corresponding fourth transparent electrode are connected with a corresponding second transparent electrode and a corresponding third transparent electrode, respectively, and wherein the touch sensor further comprises:
   a plurality of first signal lines connecting the drive IC with the first transparent electrodes, respectively; and
   a plurality of second signal lines connecting the drive IC with the second transparent electrodes or the third transparent electrodes connected with the fourth transparent electrodes, respectively.

7. The mobile terminal of claim 1, wherein a width of the third area is less than a width of the touch input.

8. The mobile terminal of claim 1, wherein the drive IC is arranged in a predetermined area of the first body corresponding to the first area without being arranged in an area of the first body corresponding to the third area.

9. The mobile terminal of claim 1, wherein the drive IC is arranged in a predetermined area of the second body corresponding to the second area without being arranged in an area of the second body corresponding to the third area.

10. The mobile terminal of claim 1, wherein the second transparent electrodes intersect with the first transparent electrodes in the first area and do not intersect with the first transparent electrodes in the third area.

11. The mobile terminal of claim 10, wherein the third transparent electrodes intersect with the first transparent electrodes in the second area and do not intersect with the first transparent electrodes in the third area.

* * * * *